United States Patent [19]

Kosinski

[11] Patent Number: 5,263,103
[45] Date of Patent: Nov. 16, 1993

[54] APPARATUS COMPRISING A LOW REFLECTION OPTICAL FIBER TERMINATION

[75] Inventor: Sandra G. Kosinski, Murray Hill, N.J.

[73] Assignee: AT&T Bell Laboratories, Murray Hill, N.J.

[21] Appl. No.: 976,623

[22] Filed: Nov. 16, 1992

[51] Int. Cl.$^5$ .............................................. G02B 6/36
[52] U.S. Cl. ........................................ 385/31; 385/55; 385/139
[58] Field of Search ....................... 385/31, 43, 46, 47, 385/48, 51, 139, 55

[56] References Cited

U.S. PATENT DOCUMENTS

| | | | |
|---|---|---|---|
| 4,290,667 | 9/1981 | Chown | 385/51 |
| 4,400,053 | 8/1993 | Kazkaz | 385/55 |
| 4,512,630 | 4/1985 | Runge | 350/96.21 |
| 4,979,972 | 12/1990 | Berkey et al. | 65/4.2 |
| 5,048,908 | 9/1991 | Blonder | 385/39 |
| 5,058,983 | 10/1991 | Corke et al. | 385/78 |

FOREIGN PATENT DOCUMENTS

| | | | |
|---|---|---|---|
| 0147301 | 8/1984 | Japan | 381/31 |
| 0240907 | 10/1987 | Japan | 385/139 |
| 2124403 | 7/1983 | United Kingdom . | |

OTHER PUBLICATIONS

R. Rao et al., "High Return Loss Connector Design Without Using Fibre Contact or Index Matching", *Electronics Letters*, vol. 22, No. 14, pp. 731-732 (1986).

Primary Examiner—John D. Lee
Assistant Examiner—Hemang Sanghavi
Attorney, Agent, or Firm—Eileen D. Ferguson; Eugen E. Pacher

[57] ABSTRACT

This invention is an apparatus which comprises a low reflection optical fiber termination. The apparatus comprises an optical fiber having a core, a cladding and a designated end. The core of the fiber has an effective refractive index N (exemplarily 1.484±0.026). A terminator having a refractive index approximately equal to N (e.g. to within ±3.5%) is attached in such a manner that the terminator and the designated fiber end are in intimate contact. The closer the refractive index of the terminator is to the refractive index of the core of the fiber, the less back reflection occurs. A curable polymer having a high refractive index can be used to coat the terminator and a portion of the fiber. There is no need to polish, bend, cleave, twist or taper the end of the optical fiber prior to attaching the substrate to the optical fiber. Thus, the apparatus can be readily and inexpensively practiced not only in the factory but also in the field.

8 Claims, 1 Drawing Sheet

APPARATUS COMPRISING A LOW REFLECTION OPTICAL FIBER TERMINATION

FIELD OF THE INVENTION

This invention relates to the field of optical fiber communications. More particularly it pertains to an apparatus that comprises a low reflection optical fiber termination.

BACKGROUND OF THE INVENTION

Optical fibers have come into wide-spread use as transmission media for communication signals. Applications include video distribution systems, data and voice communications, and sensor signal networks. Both multimode and single mode optical fiber systems are employed for such purposes.

One of the limitations encountered by optical fiber systems relates to optical noise. A common source of optical noise is optical power reflections. Optical power reflection generally occurs at any discontinuity in a fiber optic transmission path, including the end of an optical fiber, and causes a portion of the incident light to travel back toward the source. Optical power reflected in this manner may reflect again when it arrives at the source point or other points of discontinuity in the system, adding an unwanted noise component to the signal. Optical power that is reflected back into a source can also corrupt the fundamental operation of the source, typically a laser. See for instance, R. Rao et al., *Electronics Letters*, Vol. 22 (14) pages 731-732 (1986), incorporated herein by reference. Control of reflections thus is an important consideration in the design of optical fiber systems.

It is known that reflections can be essentially eliminated if the fiber end is polished at an angle such that light is reflected at an angle beyond the internal critical angle of the fiber, thereby ensuring that the reflected light is not guided by the fiber. However, polishing typically is a time consuming operation that can considerably increase the cost of an optical fiber system. Another known technique for eliminating back reflection is to cleave the fiber such that a tilted end face results, as is described in Blonder, "Method of Producing Apparatus Comprising a Low Reflection Optical Fiber Connection," U.S. Pat. No. 5,048,908. However, special equipment is needed to perform this operation. Other disadvantages associated with current methods of terminating optical fiber include the possibility of sub-surface damage, fiber breakage and contamination.

Consequently, an apparatus having a low-reflection optical fiber termination which can be practiced easily, quickly and inexpensively, and that requires no additional or special equipment would be highly desirable. Ibis application discloses such an apparatus.

Various types of optical fiber connectors are known, including connectors which use index matching liquid to improve optical coupling between the fibers. An example of such a connector is described in, Runge, "Optical Fiber Connector", U.S. Pat. No. 4,512,630.

THE INVENTION

Figure 2:
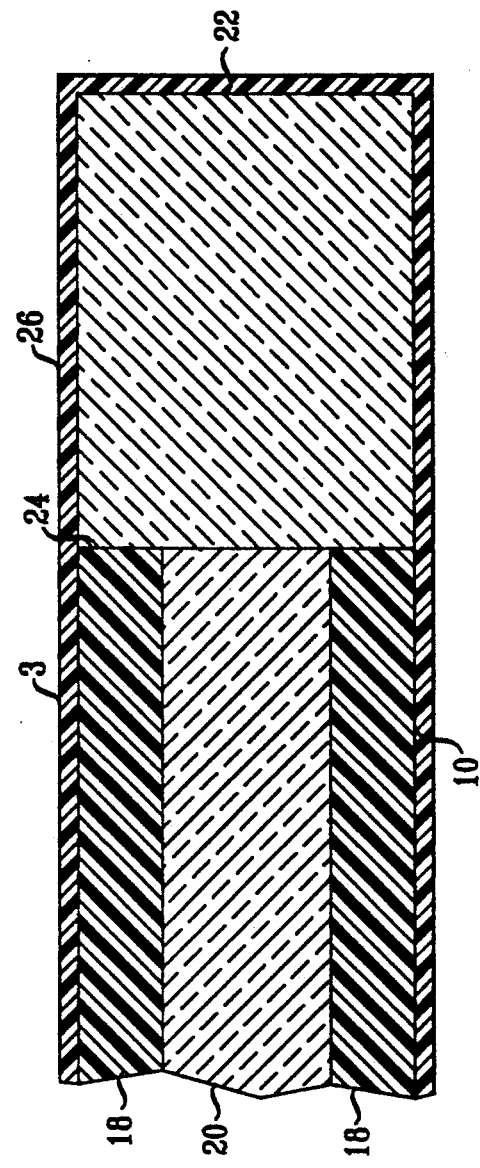
FIG. 2 is a low reflection termination of an optical fiber.

In a preferred embodiment, the invention is an apparatus (i.e. an optical communication system, an optical coupler, etc.) that comprises a low reflection optical fiber termination, schematically illustrated in FIG. 2. Numeral 3 refers to a length of optical fiber, 10 to the terminated fiber end of the optical fiber 3, 18 and 20 refer to the fiber cladding and core, respectively, 22 to the terminator attached to end 10 of the optical fiber 3, 24 to the fiber/terminator interface, and 26 to an appropriate coating which typically covers the terminator and a portion of the optical fiber. The core has an effective refractive index N (exemplarily, $N=1.484\pm0.026$ at 0.589 $\mu m$) and the cladding has an effective refractive index n, less than N. The meaning of "effective" refractive index is well known to those skilled in the optical fiber art. The terminator has a refractive index that is close (typically within $\pm3.5\%$, preferably within $\pm2\%$) to N, the effective refractive index of the fiber core, the index typically being the same throughout the terminator. The coating is typically a UV curable polymer that has a higher effective refractive index than the terminator.

Figure 1:
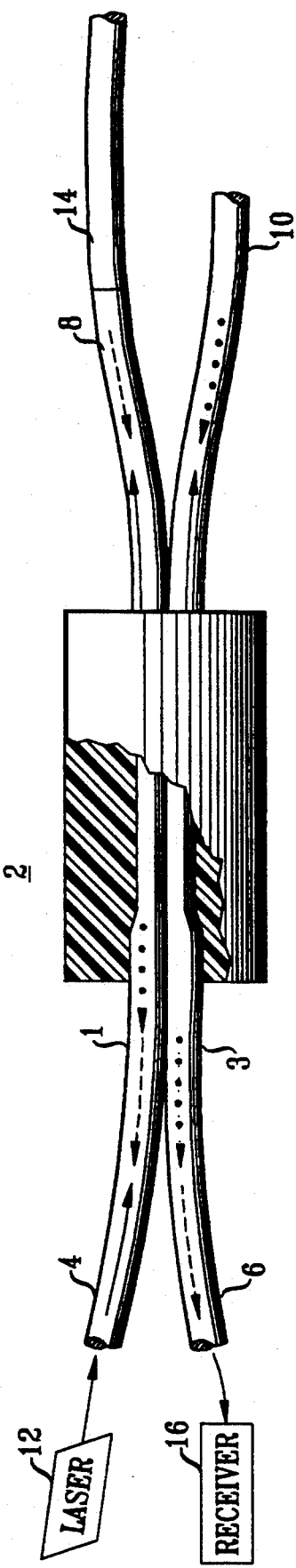
FIG. 1 is a bidirectional optical coupler having an unterminated end.

The apparatus is described in relation to a four port directional optical coupler 2, as schematically illustrated in FIG. 1. Such couplers are well known and do not require detailed description. Suffice it to say that the directional coupler 2 comprises two optical fibers 1 and 3, each having two ends 4 and 8, and 6 and 10 respectively. Exemplarily, end 4 of fiber 1 is connected to an optical transmitter 12 such as a laser; end 8 is connected to an optical fiber transmission link 14; end 6 of optical fiber 3 is connected to an optical receiver 16 and end 10 is the designated end to be terminated. The course of the light from optical transmitter 12 is indicated by the solid-line arrows, and the course of the light coming from the optical waveguide 14 is indicated by the dash-line arrows. If no reflection suppression arrangements were made at end 10, a portion of the light from the transmitter would be reflected at this end 10, as indicated by the dotted-line arrows. The portion of this reflected light that reaches the receiver would constitute noise, degrading system performance.

In a preferred embodiment, attached to end 10 is a terminator, as illustrated in FIG. 2. The terminator exemplarily is a length of core-less, non-guiding (undoped or doped) silica fiber having substantially the same diameter (e.g., 125 $\mu m$) as the fiber to be terminated. Such fiber can be readily produced, e.g. by drawing from a silica rod that was formed by collapsing a standard silica tube. When light which is transmitted down the optical fiber reaches the fiber/terminator joint, little to no reflection occurs and essentially all of the light is coupled into the terminator. The terminator desirably is selected such that the coupled-in light is scattered and/or absorbed, and preferably such that minimal to no back reflection occurs at the downstream terminal or air interface. The closer the refractive index of the terminator is to N, the less reflection occurs at the fiber/terminator interface. Use in the terminator of relatively impure material may frequently be advantageous to increase the scattering and/or absorption of the light. The terminator can be attached to the fiber by any appropriate technique, including fusion splicing or using index matched epoxy. The designated end of the fiber to be terminated typically does not require any special treatment, such as polishing, bending, twisting, cleaving or tapering, prior to attaching the terminator. However, conventional fusion splicers typically require that the fiber ends be relatively flat.

Exemplarily, fusion splicing a standard single mode fiber, (AT&T 5D fiber), having an effective core refractive index of 1.463 to a length of substantially pure $SiO_2$ fiber (refractive index 1.458) resulted in essentially reflection-free terminations when the length of the terminator was approximately 4 cm or above. When the terminator had a length of 3 cm the back reflection measured was approximately −70 dB. Those skilled in the art will appreciate that the minimum terminator length frequently will depend on terminator composition, with less pure terminator material typically making possible use of shorter terminator. The presence of an appropriate polymer coating can result in further reduced reflection. For example, by coating the above referred to 3 cm long terminator with a UV curable polymer coating 26, negligible back reflection occurred, as compared to −70 dB back reflection without the coating.

Although the inventive apparatus is described with regard to a directional coupler, those skilled in the art will appreciate that any apparatus that requires a low-reflection termination of an optical fiber is within the scope of this invention. Other contemplated uses are in optical fiber measurement apparatus and sensing apparatus.

I claim:

1. An article comprising:
   an optical fiber having a core, a cladding and a designated end, the core having an effective refractive index N; and
   an elongated body (to be designated the "terminator") attached to the designated end of said optical fiber wherein the terminator has a substantially constant refractive index in the range 0.965N–1.035N throughout the terminator.

2. An article according to claim 1 wherein at least the terminator is coated with a polymer coating having a refractive index greater than that of the terminator.

3. An article according to claim 1 wherein the terminator is substantially the same diameter as said optical fiber and is attached to said designated end of the optical fiber by means of fusion splicing.

4. An article according to claim 1 wherein the terminator is attached to said designated end of the optical fiber by means of index matched epoxy.

5. An article according to claim 4 wherein said index matched epoxy has a refractive index which is in the range 0.965N–1.035N.

6. An article according to claim 1 wherein the terminator has a length of 3 cm or greater.

7. An article according to claim 1 wherein the terminator is a core-less silica fiber.

8. An article according to claim 7, wherein said core-less silica fiber comprises Ge.

* * * * *